(12) United States Patent
Martin et al.

(10) Patent No.: US 9,628,688 B2
(45) Date of Patent: Apr. 18, 2017

(54) SECURITY CAMERA HAVING A BODY ORIENTATION SENSOR AND METHOD OF USE

(71) Applicant: Sensormatic Electronics, LLC, Boca Raton, FL (US)

(72) Inventors: Walter Martin, Glenwherry (GB); Stephen McMurray, Banbridge (GB)

(73) Assignee: Sensormatic Electronics, LLC, Boca Raton, FL (US)

( * ) Notice: Subject to any disclaimer, the term of this patent is extended or adjusted under 35 U.S.C. 154(b) by 78 days.

(21) Appl. No.: 14/496,901

(22) Filed: Sep. 25, 2014

(65) Prior Publication Data

US 2016/0094764 A1    Mar. 31, 2016

(51) Int. Cl.
*H04N 5/225*   (2006.01)
*H04N 7/18*    (2006.01)
*G01P 15/00*   (2006.01)
*G08B 13/196*  (2006.01)

(52) U.S. Cl.
CPC ........... *H04N 5/2259* (2013.01); *G01P 15/00* (2013.01); *G08B 13/19636* (2013.01); *H04N 7/18* (2013.01)

(58) Field of Classification Search
None
See application file for complete search history.

(56) References Cited

U.S. PATENT DOCUMENTS

| | | | |
|---|---|---|---|
| 6,356,308 B1 * | 3/2002 | Hovanky | F16M 11/10 348/143 |
| 2004/0178920 A1 | 9/2004 | Tews et al. | |
| 2008/0204560 A1 * | 8/2008 | Nilsson | H04N 17/002 348/187 |
| 2010/0220202 A1 * | 9/2010 | Roskowski | H04N 5/23212 348/211.3 |
| 2011/0128350 A1 | 6/2011 | Oliver et al. | |
| 2011/0228098 A1 * | 9/2011 | Lamb | G01S 17/023 348/164 |
| 2012/0092550 A1 * | 4/2012 | Urashima | H04N 5/2253 348/374 |
| 2012/0120264 A1 * | 5/2012 | Lee | G06T 7/20 348/208.4 |

(Continued)

FOREIGN PATENT DOCUMENTS

EP    2713605 A1    4/2014

OTHER PUBLICATIONS

PCT/US2015/052045 Partial International Search Report, mailed Dec. 9, 2015. Three pages.

(Continued)

*Primary Examiner* — Shahbaz Nazrul (74) *Attorney, Agent, or Firm* — HoustonHogle LLP (57) ABSTRACT

A security camera includes a camera body and a body orientation sensor for detecting an orientation of the camera body. The security camera can include an orientation feedback system used with the body orientation sensor to adjust a position of the security camera to true camera. This orientation feedback system indicates degree to which the camera body is off horizontal/vertical. The security camera is part of a video security system that has an image processing unit for de-warping and/or rotating (e.g., 90 degrees) a raw image based on the orientation detected by the body orientation sensor.

12 Claims, 10 Drawing Sheets

(56) References Cited

U.S. PATENT DOCUMENTS

| | | | | |
|---|---|---|---|---|
| 2012/0147181 A1* | 6/2012 | Duner | ............ | G03B 17/02 |
| | | | | 348/143 |
| 2012/0212622 A1* | 8/2012 | Nakamura | ............ | G01S 3/7864 |
| | | | | 348/169 |
| 2013/0250126 A1* | 9/2013 | Nakamura | ............ | H04N 5/2252 |
| | | | | 348/169 |
| 2014/0002648 A1* | 1/2014 | DiPoala | ............ | G08B 17/00 |
| | | | | 348/143 |
| 2014/0232860 A1* | 8/2014 | Martin | ............ | H04N 5/23212 |
| | | | | 348/143 |
| 2015/0002688 A1* | 1/2015 | Baldwin | ............ | H04N 5/23203 |
| | | | | 348/211.9 |
| 2015/0341536 A1* | 11/2015 | Huang | ............ | H04N 5/2328 |
| | | | | 348/208.2 |
| 2016/0014345 A1* | 1/2016 | Foster | ............ | H04N 5/247 |
| | | | | 396/104 |

OTHER PUBLICATIONS

International Search Report and Written Opinion of the International Searching Authority, mailed on Feb. 18, 2016, from International Application No. PCT/US2015/052045, filed on Sep. 24, 2015. Fourteen pages.

\* cited by examiner

SECURITY CAMERA HAVING A BODY ORIENTATION SENSOR AND METHOD OF USE

BACKGROUND OF THE INVENTION

Video security systems are often deployed in and around buildings as well as in metropolitan settings. Example buildings and metropolitan settings include schools, government buildings, commercial buildings, residential buildings, and town and city centers.

These video security systems typically include security cameras that connect via a security network to a control system. Additional components include network video recorder (NVR) systems and monitors for displaying images such as video from the security cameras.

The security cameras typically have a lens and imager system that is fixed, adjustable, or motorized. A fixed security camera will have the lens and imager system permanently fixed in a set position (i.e., lens and imager system cannot change position with respect to camera body). On the other hand, an adjustable security camera's lens and imager system is movable with respect to camera body (e.g., installer can move the lens and imager system to different positions) so that it can be pointed down a hall or at a door, for example. A motorized security camera, such as a pan-tilt-zoom (PTZ) security camera, utilizes motor(s) to automatically move the lens and imager system to different positions usually under operator or automatic control.

An example of the fixed security camera is a fisheye security camera. The fisheye security camera uses an ultra-wide-angle fisheye lens to form an image on the imager chip.

The fisheye security camera is typically used in situations in which there is a need to capture a wide field of view in a single image. The fisheye security camera provides this wide field of view by utilizing the fisheye lens to provide, for example, between 180 degrees and 360 degrees of surveillance range. Due to the wide field of view, the raw image captured by the imager chip is distorted, however.

An example of the adjustable security camera is a dome security camera. The adjustable or dome security camera's lens and imager system includes a lens (e.g., normal lens, wide-angle lens, or long-focus lens) that forms an image on the imager chip. This lens and imager system is adjustable such that it can be positioned in different directions using a gimbal system. Often these gimbal systems enable movement along at least two axes (e.g., two-axis gimbal or three-axis gimbal). The two-axis gimbal provides movement along a roll axis and a tilt axis whereas the three-axis gimbal provides movement along the roll axis, tilt axis, and pan axis. The gimbal allows the adjustable lens and imager system to be moved manually during and after installation to change the fields of view. The adjustable or dome security camera is typically used in locations in which there is a need to capture images from a specific direction.

The installation process of a fixed security camera (e.g., fisheye security camera) for a video security system involves several steps. An installer mounts the fisheye security camera at a desired location that allows for the fisheye security camera to capture a wide area of interest. For example, the fish eye security camera is typically installed directly to a wall or ceiling of a room (i.e., wall mode orientation or ceiling mode orientation) such that the fish eye security camera is positioned to view an entire room. The camera should usually be leveled to ensure good image orientation. Then, the installer will usually program the video security system with the fixed security camera's orientation.

The installation process of the adjustable or dome security camera for the video security system is slightly different. After the adjustable or dome security camera is attached to the wall or ceiling, the lens and imager system is typically positioned to provide either a corridor orientation or landscape orientation with respect to the area of interest. Then, the installer will usually program the video security system with the adjustable or dome security camera's orientation.

In general, there is distortion processing software. Distortion processing software can be used to correct a distorted or warped image by de-warping the image. In particular, this distortion processing software uses image processing algorithms or models corresponding to the lens being used (e.g., fish eye lens) to correct the distorted image.

SUMMARY OF THE INVENTION

The present invention concerns including one or more orientation sensors in security cameras to automatically determine orientation information. The orientation information can be used to assist in the process or leveling or trueing cameras. Orientation information can also be used in the process of image correction for de-warping and/or rotating (e.g., 90 degrees) raw image data received from security cameras. This feature eliminates the step of manually inputting orientation information. This feature can also be utilized to accurately install a security camera to a wall or ceiling such that the security camera is level (i.e., positioned to true camera).

In general, according to one aspect, the invention features a security camera that includes a camera body and a body orientation sensor for detecting an orientation of the camera body.

In embodiments, the body orientation sensor is mounted to an external surface or an internal surface of the camera body.

Typically, the body orientation sensor is an accelerometer. In one case, the accelerometer is at least a two-axis or three-axis accelerometer.

In embodiments, the security camera further includes a lens and imager system for capturing a raw image. In one application, this raw image is de-warped and/or rotated (e.g., 90 degrees) based on the orientation detected by the body orientation sensor.

In one embodiment, the security camera further includes a lens orientation sensor for detecting an orientation of the adjustable lens and imager system of the camera.

In embodiments, the security camera includes an orientation feedback system for indicating degree to which the camera body is off horizontal/vertical based on the orientation detected by the body orientation sensor. The orientation feedback system generates light, sound, or web content for indicating degree to which the camera body is off horizontal/vertical. In one application, the detected orientation is a horizontal orientation. In another application, the detected orientation is a vertical orientation.

In general, according to another aspect, the invention features a method of operation of a video security system. This method includes a body orientation sensor detecting an orientation of a camera body and an image processing unit de-warping and/or rotating a raw image based on the orientation detected by the body orientation sensor.

In embodiments, the image processing unit is within a camera controller or a control system.

In one embodiment, the image processing unit de-warps and/or rotates the raw image based on the orientations detected by the body orientation sensor and the lens orientation sensor.

In general, according to still another aspect, the invention features an installation method for a security camera that includes a body orientation sensor detecting an orientation of the camera body after being mounted, a camera controller determining a degree to which the camera body is off horizontal/vertical orientation based on the detected orientation from the body orientation sensor, and an orientation feedback system indicating degree to which the camera body is off horizontal/vertical orientation.

In embodiments, the orientation feedback system is a light emitting diode (LED) that indicates the horizontal/vertical orientation by generating light, a speaker that indicates the horizontal/vertical orientation by generating sound, or an electronic interface that indicates the horizontal/vertical orientation be generating web content or other types of messages that are sent or served to a mobile computing device (smart phone or tablet computing device) operated by the installer.

In embodiments, the camera controller determines whether the camera body is in a vertical orientation or a horizontal orientation based on the detected orientation from the body orientation sensor.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
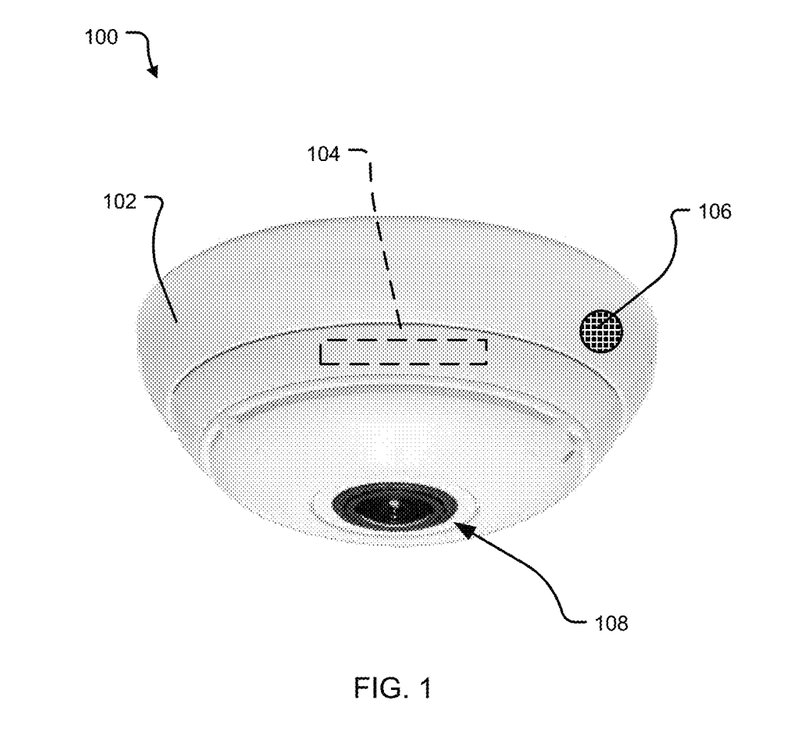
FIG. 1 is a perspective view of a fixed security camera (e.g., fisheye security camera) including a body orientation sensor.

FIG. 1 shows a fixed security camera 100 (e.g., fisheye security camera) which has been constructed according to the principles of the present invention.

The fixed security camera 100 includes a body orientation sensor 104 for detecting an orientation of the camera body 102. In one example, the body orientation sensor 104 is mounted to an outer housing of the camera body 102. In other examples, the body orientation sensor 104 is mounted internally such as on a circuit board within the camera body 102. In another example, the body orientation sensor 104 is positioned within a wall of the camera body 102.

The body orientation sensor 104 detects the orientation of the camera body 102 based on the angular relationship of the camera body 102 with respect to gravity. Typically such sensors are referred to as accelerometers. In particular, the body orientation sensor 104 can be a two-axis accelerometer or a three-axis accelerometer system.

Figure 2:
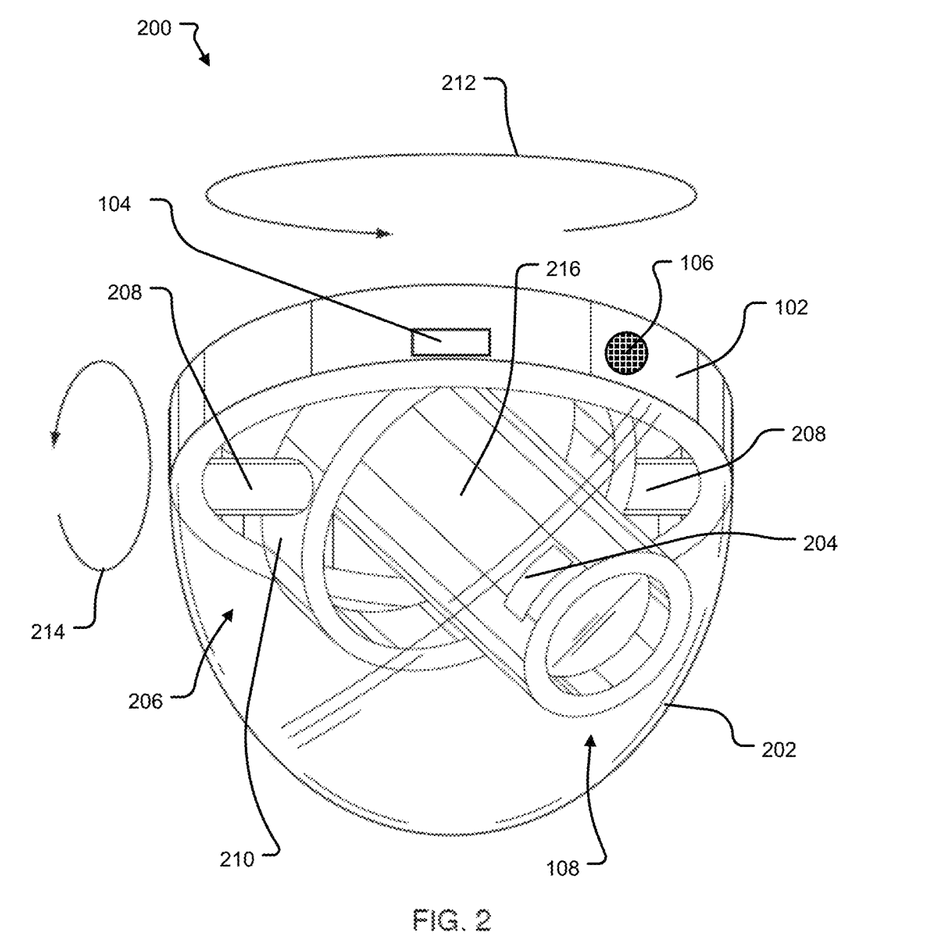
FIG. 2 is a perspective schematic view of an adjustable or dome security camera including a body orientation sensor and a lens orientation sensor.

FIG. 2 illustrates an adjustable security camera 200 (e.g., dome security camera) according to another embodiment.

The lens and imager system 108 of the adjustable or dome security camera 200 can be repositioned in different directions using a gimbal 206. In the illustrated example, the gimbal 206 provides movement along two axes (pan axis 212 and tilt axis 214). In an alternative example, the gimbal 206 is a three-axis gimbal that provides movement along the pan axis 212, tilt axis 214, and roll axis.

The example two-axis gimbal 206 includes pan joints 208 and a circular tilt boom 210. The lens and imager system 108 is attached to the tilt boom 210 such that the lens and imager system 108 can tilt along the tilt direction 214. The pan joints 208 are attached on two ends of the tilt boom 210 to aid in providing the tilting movement 214. The pan joints 208 are positioned within the camera body 102 to provide panning along the pan direction 212 independent from the tilting movement 214. For example, the pan joints 208 are positioned in a pan track of an inner surface of the camera body 102 such that the pan joints 208 can rotate along this pan track in the camera body 102. Thus, the gimbal 206 uses the pan joints 208 and tilt boom 210 to provide panning and tilting movements 212, 214.

The lens and imager system 108 is mounted to this gimbal 206 which can be positioned to move in a variety of directions along the pan and tilt axes 212, 214. In one example, this two-axis gimbal 206 provides about 360 degrees of panning movement 212 and about 90 degrees of tilting movement 214.

The adjustable or dome security camera 200 includes two orientation sensors: body orientation sensor 104 and lens orientation sensor 204, in the illustrated embodiment. These sensors together provide for the ability to track the camera body's orientation independently from the lens and imager system's orientation.

Similar to the fixed security camera 100, the body orientation sensor 104 is mounted to a portion of the camera body 102 of the adjustable or dome security camera 200. For example, the body orientation sensor 104 is mounted to an outside surface, inside surface, or within the camera body 102.

The lens orientation sensor 204 detects an orientation of the lens and imager system 108. The lens orientation sensor 204 is attached to a portion of the lens and imager system 108. For example, as shown in FIG. 2, the lens orientation sensor 204 is mounted to an external surface of the lens tube 216. Alternatively, the lens orientation sensor 204 is mounted to a circuit board in the lens and imager system 108 or even made part of the imager chip. Similar to the body orientation sensor 104, the lens orientation sensor can be a two-axis accelerometer or three-axis accelerometer.

The adjustable or dome security camera 200 includes a dome cover 202 mounted over the lens and imager system 108. In particular, the dome cover 202 is attached to a perimeter of the camera body 102 providing a housing that protects the lens and imager system 108 from external elements.

As shown in FIGS. 1-2, the fixed security camera 100 and adjustable or dome security 200 include an orientation feedback system (e.g., light or speaker) 106 that indicates to an installer whether the camera body 102 is level or not level. In one example, the orientation feedback system 106 is a speaker (i.e., provides sound feedback). In another example, the orientation feedback system 106 is a light such as a light-emitting diode (LED) (i.e., provides light feedback).

Figure 3:
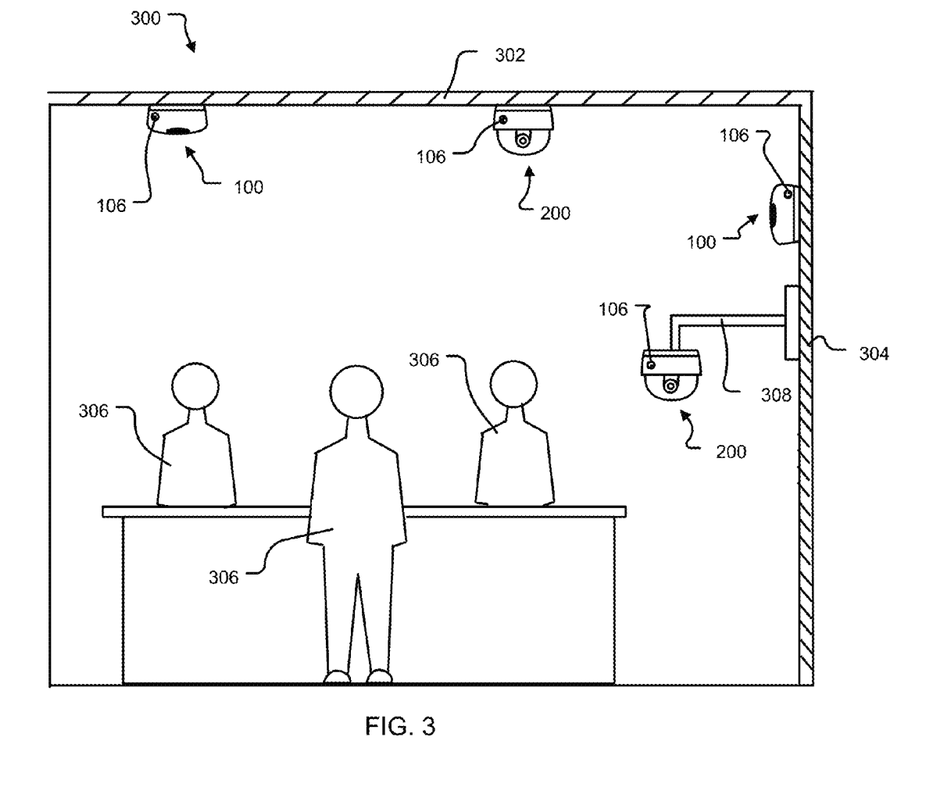
FIG. 3 is a perspective schematic view of a room or hallway with fixed security cameras and adjustable security cameras installed either on the ceiling or wall.

FIG. 3 illustrates an exemplary room or hallway 300 with installed fixed security cameras 100 (e.g., fisheye security cameras) and adjustable or dome security cameras 200. The security cameras 100, 200 are installed in different orientations for monitoring the room or hallway 300 and individuals 306 in the room or hallway 300. The security cameras 100, 200 are mounted to the ceiling 302 or to the wall 304.

The fixed security cameras 100, such as fisheye security cameras, are installed directly to the wall 304 or ceiling 302 of the room or hallway 300 (i.e., wall mode orientation or ceiling mode orientation) to capture a wide area of interest.

The adjustable or dome security cameras 200 are attached to the ceiling 302 or wall 304 and then aimed at a particular area of interest, usually by the installer. In one installation, the adjustable or dome security camera 200 is mounted to the wall 304 by a wall bracket 308. The wall bracket 308 effectively moves the field of view for the adjustable or dome security camera 200 beyond objects in the room or hallway 300 that would otherwise obstruct the field of view of the adjustable or dome security camera 200. In another installation, the adjustable or dome security camera 200 is mounted directly to the ceiling 302. After the adjustable or dome security camera 200 is mounted to the wall 304 or ceiling 302, the lens and imager system 108 is positioned using the gimbal 206 to provide either a corridor view (i.e., corridor mode) or landscape view (i.e., landscape mode) with respect to the room or hallway 300.

Figure 4A:
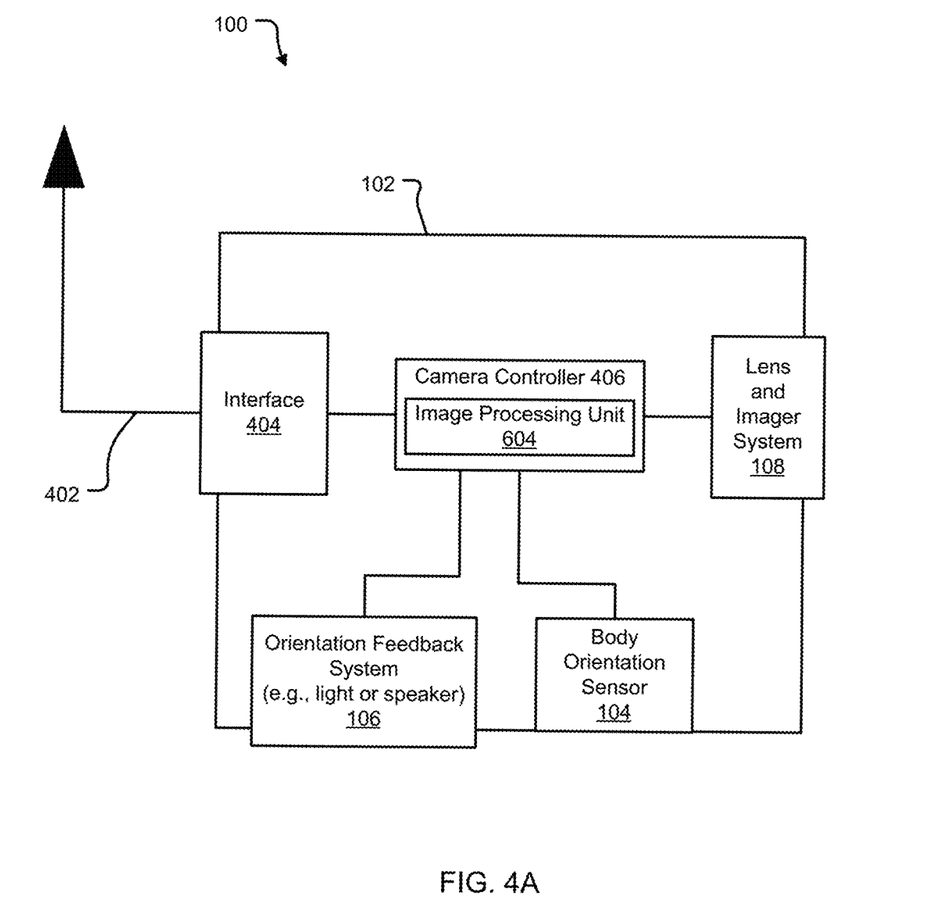
FIG. 4A is a schematic diagram of the components within the fixed security camera.
Figure 4B:
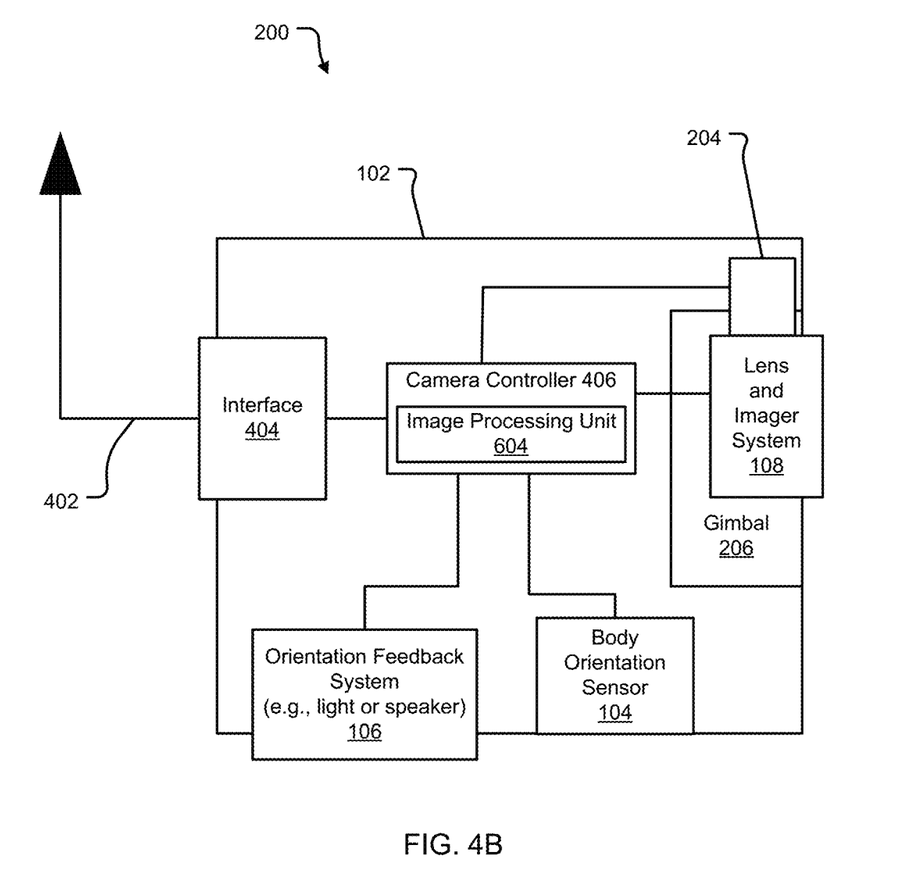
FIG. 4B is a schematic diagram of the components within the adjustable security camera.
Figure 4C:
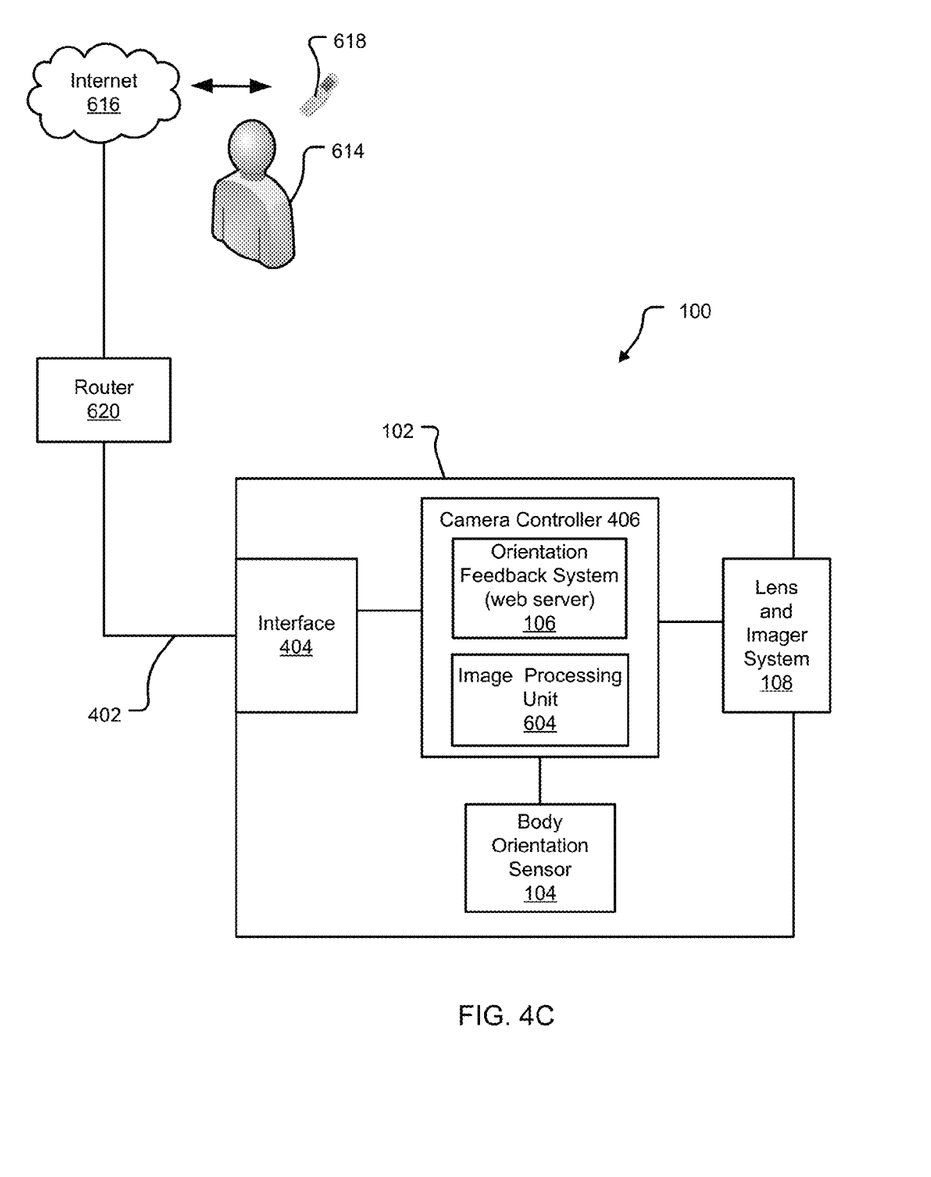
FIG. 4C is a schematic diagram of the fixed security camera having an orientation feedback system (web server) that provides electronic, e.g., web, content indicating the orientation.

FIGS. 4A-4C illustrate the main components of the security cameras 100, 200 according to embodiments. FIG. 4A illustrates an example fixed security camera 100 and FIG. 4B illustrates an example adjustable or dome security camera 200.

The security cameras 100, 200 include a camera controller 406. The camera controller 406 manages and directs various security camera features such as use of the lens and imager system 108. Also, the camera controller 406 directs output of data including image data to the security network 402 through an interface 404. The camera controller 406 can also manage power distribution through this interface 404 as well. The camera controller 406 directs actions by certain components based on orientation information received from the body orientation sensor 104. In one example, the camera controller 406 drives the orientation feedback system 106 based on orientation information received from the body orientation sensor 104.

The security cameras 100, 200 include the lens and imager system 108 which generates raw images of a field of interest. The lens and imager system 108 includes an imager chip and a lens train. The lens train (e.g., fisheye lens or normal lens) forms images of a field of view onto the imager chip. The images on the imager chip are directed by the lens and imager system 108 to the camera controller 406.

Depending on the type of lens train and/or orientation of the camera, the raw images on the imager chip may need correction (e.g., de-warped and/or rotated). For example, a fisheye lens produces raw images that are typically distorted or warped. Also, images may be upside down or rotated by 90 degrees depending on the installed orientation of the camera (e.g., camera positioned upside down).

An image processing unit 604 de-warps and/or rotates raw images to produce corrected images based on detected orientation information, in one implementation. This image processing unit 604 is within the camera controller 406, in one example. Alternatively, the camera controller 406 directs the unprocessed raw image data to an image processing unit 605 independent from the security camera 100, 200, such as in a control system. For the fixed security camera 100, the detected orientation information is received from the body orientation sensor 104. For the adjustable or dome security camera 200, the detected orientation information is received from the body orientation sensor 104 as well as the lens orientation sensor 204.

As shown in FIG. 4B and described above, the adjustable or dome security camera 200 additionally includes the gimbal 206 and the lens orientation sensor 204. The gimbal 206 provides for movement of the lens and imager system 108 while the lens orientation sensor 204 detects the orientation of the lens and imager system 108 separate from the orientation of the camera body 102. The lens orientation sensor 204 is in communication with the camera controller 406 to provide the detected orientation for the lens and imager system 108.

FIG. 4C illustrates an example where the orientation feedback system (web server) 106 provides feedback or information as electronic (web) content according to another embodiment.

Here, the orientation feedback system (web server) 106 provides web content on a website accessed by a mobile computing device 618 of an installer 614. The web content can be in the form of messages using words, colors, sounds, etc. as appreciated by one of skill in the art. In general, the orientation feedback system (web server) 106 provides messages that indicate that the camera body 102 is level or not level and/or the angle of the body 102 and/or the degree to which the body is out of level.

As illustrated, the fixed security camera 100 includes a web server or application server process 106 executed by the camera controller 200. The camera controller 406 utilizes this orientation feedback system (web server) 106 to provide feedback in the form of web content on the Internet 616 and router 620, for example. The installer 614 can use the mobile device 618 to access this data on either a webpage or mobile application.

Similar to FIG. 4C, in another example, this orientation feedback system (web server) 106 is included in the camera controller 406 of the adjustable or dome security camera 200 to provide feedback as web content from the adjustable or dome security camera 200.

Figure 5:
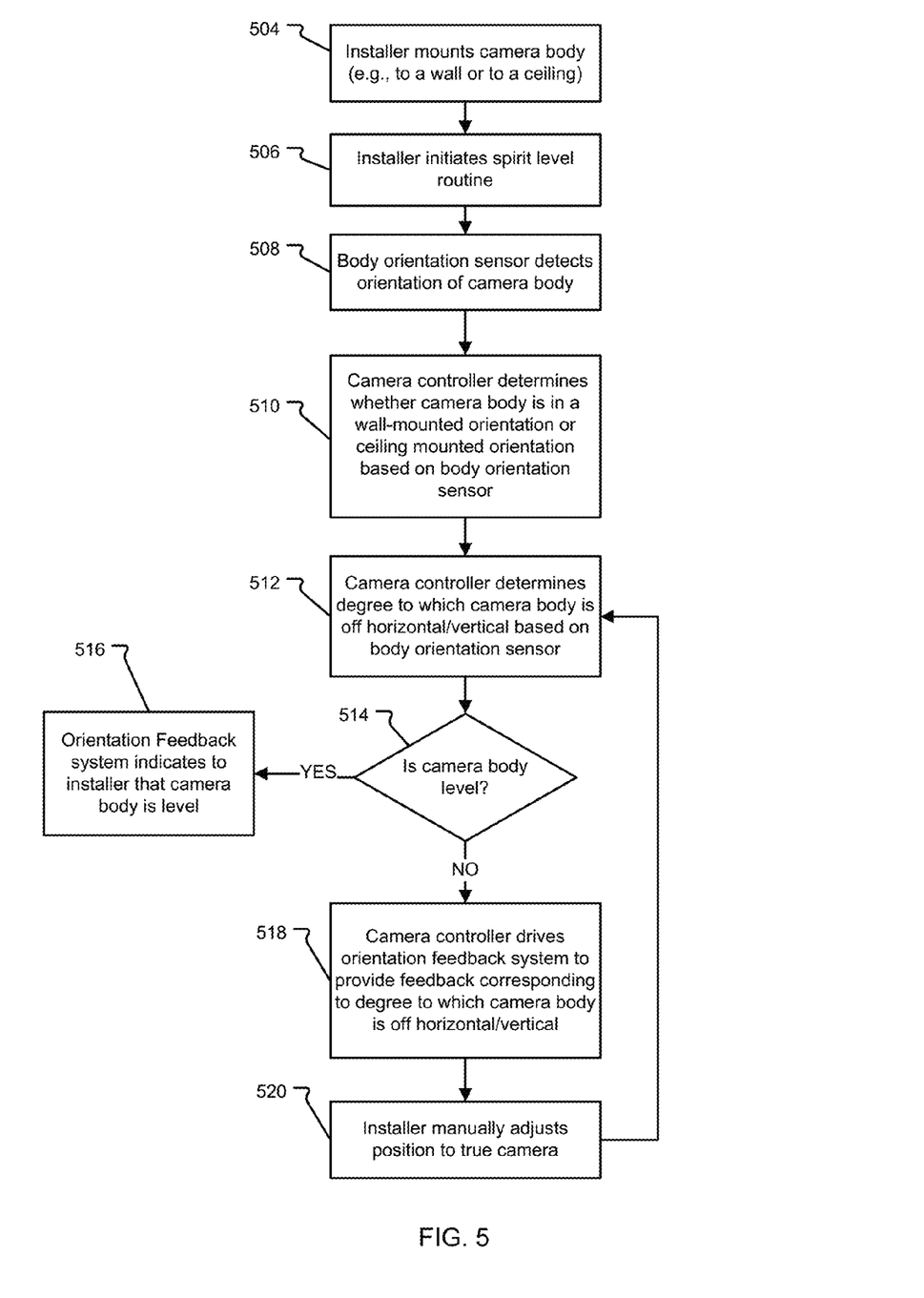
FIG. 5 is a flowchart illustrating the steps performed to true a camera based on feedback from an orientation feedback system.
Figure 6:
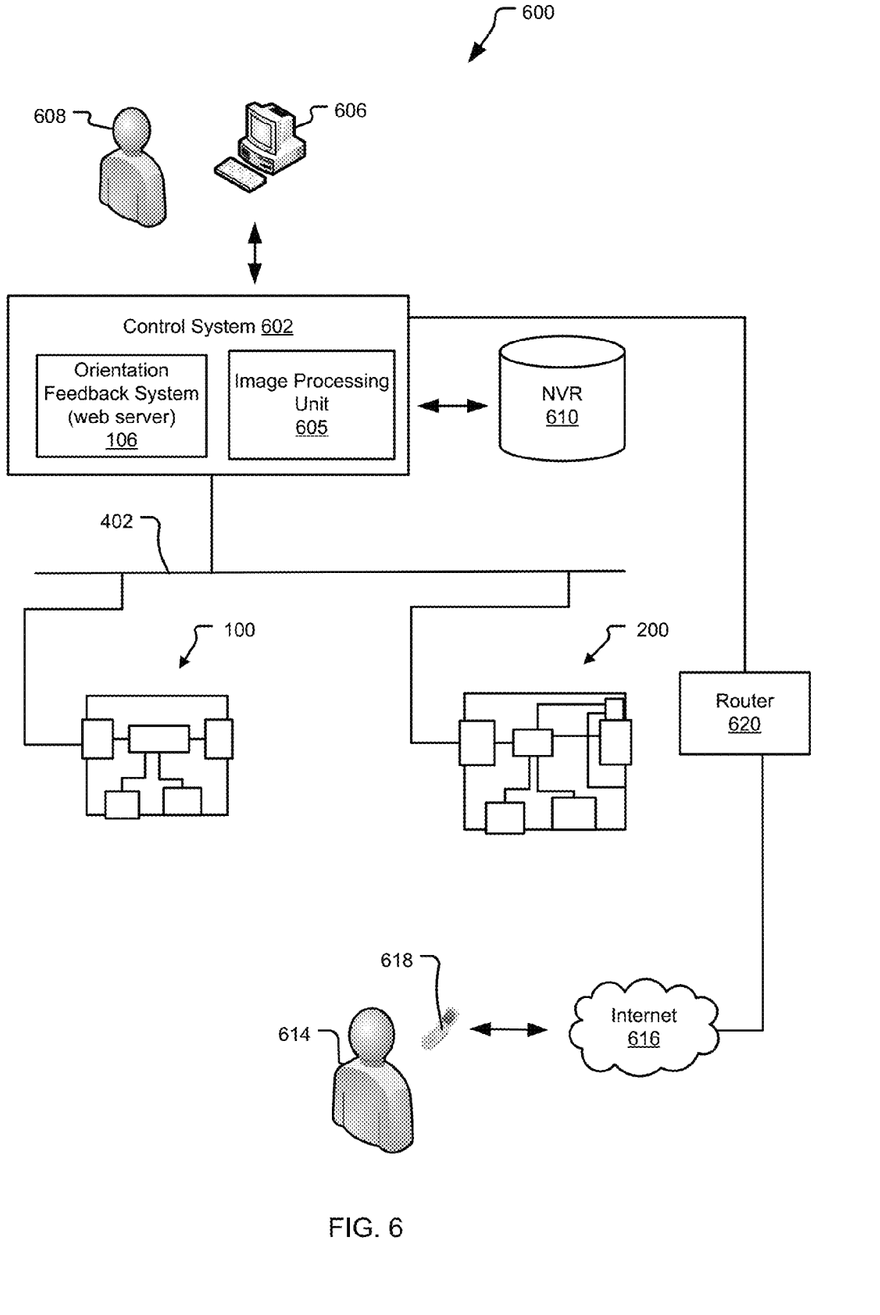
FIG. 6 is a schematic diagram of a video security system.

FIG. 5 illustrates the process of adjusting the position of the security camera 100, 200 to true camera based on the orientation feedback system 106. This process utilizes the orientation feedback system 106 for communicating to an installer 614, as shown in FIGS. 4C and 6, that the camera body 102 is level or a degree to which the camera body 102 is not level. This degree (e.g., how far off horizontal/vertical) is based on the detected orientation of the camera body 102 which drives the orientation feedback system 106 accordingly.

In one example, the truing process includes the following steps.

In step 504, an installer 614, mounts a camera body 102 to a location. For example, the camera body 102 is mounted to the ceiling 302 or wall 304.

A spirit level routine is then invoked on the camera controller 406 at step 506.

In step 508, the body orientation sensor 104 detects an orientation of the camera body 102. The camera controller 406 determines whether the camera body 102 is in a vertical orientation (i.e., wall-mounted orientation) or horizontal orientation (i.e., ceiling mounted orientation) based on the body orientation sensor 104 (step 510). For example, if the angle between the plane of the base and vertical is less than 45 degrees, the controller 406 concludes that the camera body 102 is intended to be installed in a vertical orientation, and if the angle between the plane of the base and vertical is greater than 45 degrees, the controller 406 concludes that the camera body 102 is intended to be installed in a horizontal orientation In step 512, the camera controller 406 determines degree to which the camera body 102 is off horizontal/vertical based on the detected orientation from the body orientation sensor 104.

At step 514, the controller 406 determines if the camera body 102 is level. If the camera body 102 is level, then the orientation feedback system 106 provides indication to the installer 614 that the camera body 102 is level (step 516) (e.g., using light from an LED, sound from a speaker, or web content from a web server). For example, this indication can be a continuous light from the LED, a constant tone played by the speaker, or displaying "Level" as web content. If the camera is not level, the camera controller 406 drives the orientation feedback system 106 to provide feedback corresponding with a degree to which the camera body 102 is not level (i.e., off horizontal/vertical) (step 518). For example, this feedback can be indicated by blinking the LED, multiple sounds (e.g., beeps) from the speaker, or displaying a position on a scale between "Level" and "Not Level" corresponding with how off horizontal/vertical. For example, slow flashing of the light means the camera body 102 is more off horizontal/vertical and a fast flashing of the light means the camera body 102 is less off horizontal/vertical. With sound, for example, a long tone is more off horizontal/vertical and short tone is less off horizontal/vertical. For the web content, the position on the scale between "Level" and "Not Level" relates to the camera body 102 as more or less off horizontal/vertical. In step 520, installer 614 adjusts the position of the camera body 102 to true camera based on this indication from the orientation feedback system 106.

FIG. 6 illustrates a video security system 600 with security cameras 100, 200 installed and connected on the security network 402. The security network 402 provides the security cameras 100, 200 with access to a control system 602. The security network 402 is typically a public data network (e.g., the Internet), a private data network (e.g., local area network), and/or combination of those networks.

In general, the control system 602 manages, directs, and responds to information received from security cameras 100, 200 via the security network 402. For example, the control system 602 can direct images received from security cameras 100, 200 via the security network 402 to be displayed and/or recorded to the NVR 610. In another example, the control system 602 can be used to provide feedback and correct raw images based on information received from the security cameras 100, 200.

In the illustrated example of FIG. 6, the control system 602 includes the orientation feedback system (web server) 106. The control system 602 drives this orientation feedback system (web server) 106 based on orientation information from the camera controllers 406 in the embodiment where the cameras do not provide this information directly. As described above, the orientation feedback system (web server) 106 provides feedback or indication information as web content (e.g., on a website or mobile application) on the Internet 616. The installer 614 can use the mobile device 618 to access this web content from the orientation feedback system (web server) 106 of the control system 602 for the camera that they are currently installing.

In the illustrated example, the control system 602 includes an image processing unit 605 in some embodiments. As described above, the image processing unit 605 de-warps and/or rotates raw images based on orientation information to produce corrected images. In some embodiments, the camera controller 406 directs the orientation information from the orientation sensors 104, 204 to the control system 602 to be used by the image processing unit 605 to correct the raw images from the cameras rather than the cameras themselves correcting the images.

The control system 602 directs corrected images from the image processing unit 604 (e.g., on control system 602 or on camera controller 406) for display and/or to be recorded. For example, the control system 602 forwards the corrected images to a monitor 606 that displays the corrected images for viewing by a user 608. The control system 602 also typically forwards the corrected images to be recorded, at predefined intervals for example, on the NVR system 610. In one particular example, the NVR system 610 can record the corrected images as well as add time and date information to allow the recorded images to be indexed and reviewed in the future.

Figure 7A:
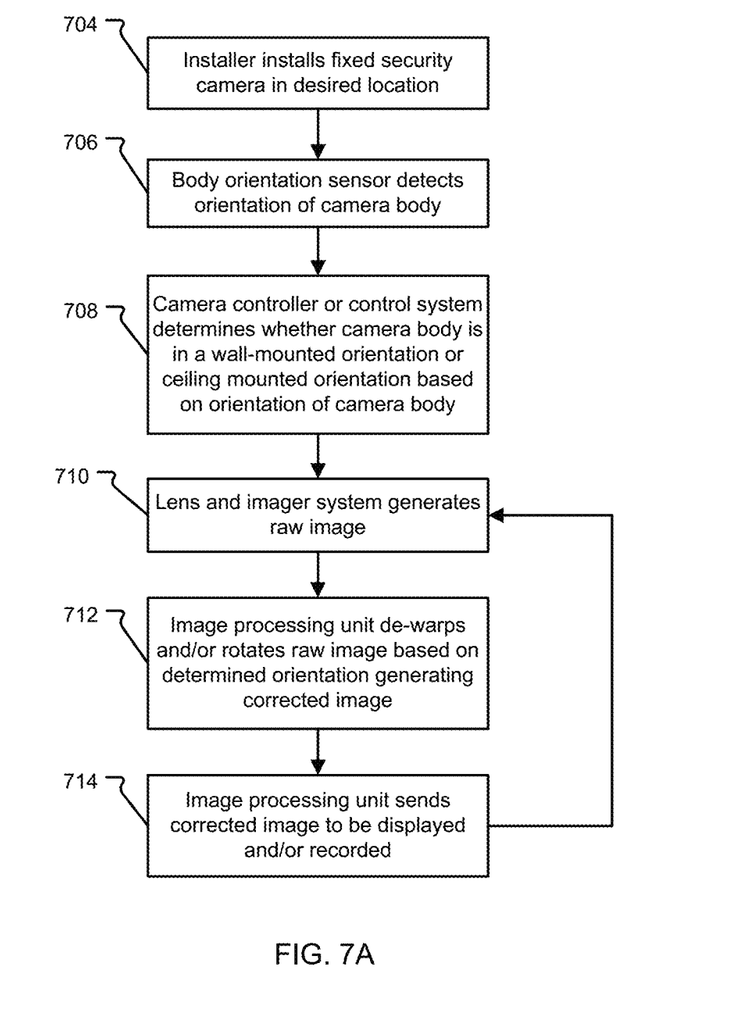
FIG. 7A is a flowchart illustrating the steps of de-warping and/or rotating (e.g., 90 degrees) a raw image for a fixed security camera (e.g., fisheye security camera)

FIG. 7A is a flow chart illustrating the process of de-warping and/or rotating raw images based on detected orientation for a fixed security camera 100 according to another embodiment.

Initially, in step 704, installer 614 installs the fixed security camera 100 (e.g., fisheye security camera) in a desired location. After installing the fixed security camera 100, the body orientation sensor 104 detects the orientation of the camera body 102 (step 706). In step 708, the camera controller 406 or control system 602 determines whether the fixed security camera 100 is in a vertical orientation (i.e., wall-mounted orientation) or a horizontal orientation (i.e., ceiling mounted orientation) based on detected orientation of the camera body 102. The lens and imager system 108 generates a raw image at step 710. In step 712, the image processing unit 604 or 605 de-warps and/or rotates (e.g., 90 degrees) raw image based on the determined orientation (wall-mounted or ceiling mounted). For example, the image processing unit 604, 605 selects either a wall-mounted image processing algorithm or a ceiling mounted image processing algorithm which is used in de-warping and/or rotating the raw image. Step 712 generates a corrected image based on the application of either the wall-mounted image processing algorithm or ceiling mounted image processing algorithm. In step 714, the image processing unit 604 or 605 sends the corrected image to the monitor 606 and/or NVR system 610 (i.e., display and/or record). After step 714, this process repeats itself at step 710 for future images.

Figure 7B:
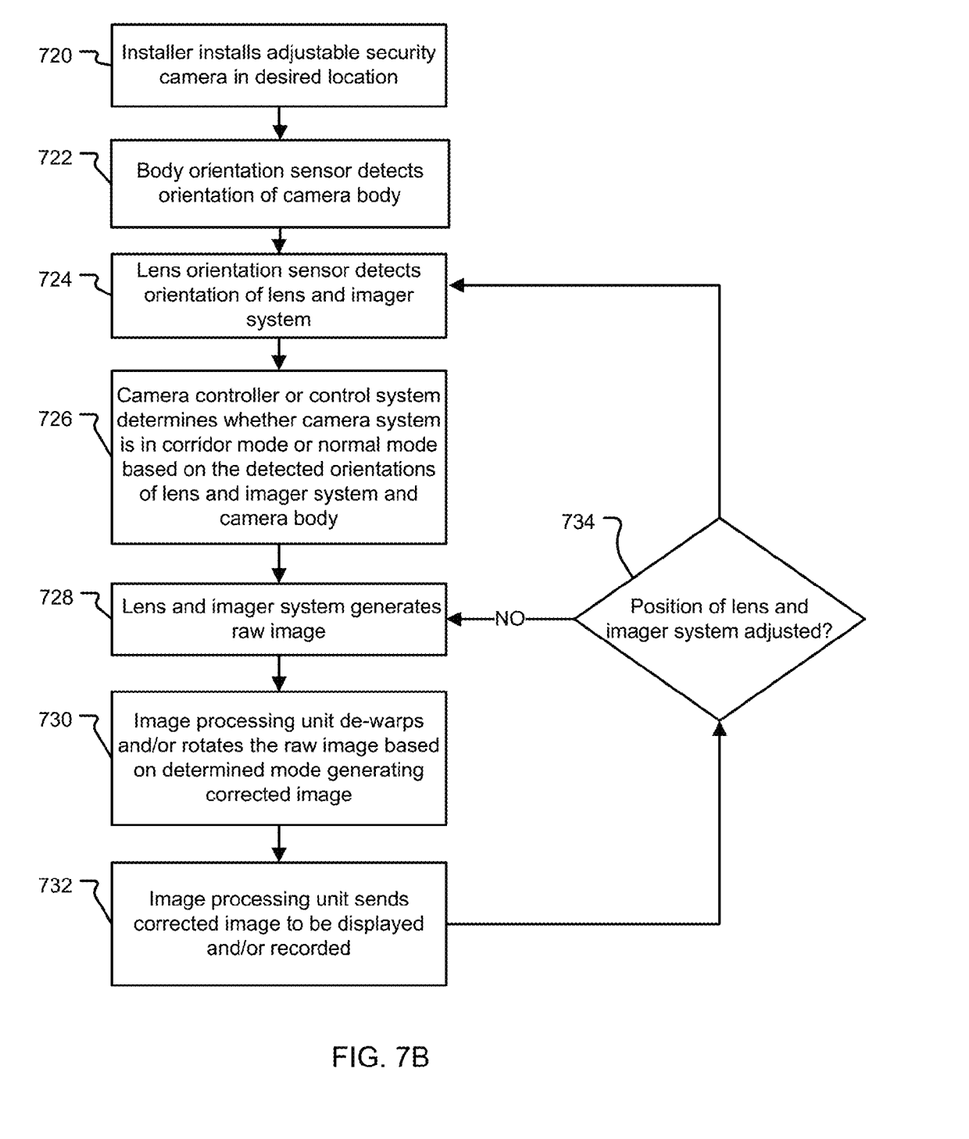
FIG. 7B is a flowchart illustrating the steps of de-warping and/or rotating (e.g., 90 degrees) a raw image for an adjustable or dome security camera.

FIG. 7B is a flow chart illustrating the process of de-warping and/or rotating raw images based on detected orientation for an adjustable or dome security camera 200 according to another embodiment.

Initially, in step 720, installer 614 installs the adjustable or dome security camera 200 in a desired location. After installing the adjustable or dome security camera 200, the body orientation sensor 104 detects orientation of the camera body 102 (step 722). In step 724, the lens orientation sensor 204 detects orientation of the lens and imager system 108. The camera controller 406 or control system 602 determines whether the adjustable security camera 200 is in a horizontal orientation (i.e., corridor orientation) or a vertical orientation (i.e., normal orientation) based on the detected orientations from the body orientation sensor 104 and lens orientation sensor 204 (step 726). For example, the camera controller 406 mathematically (e.g., using geometry) determines whether the lens and imager system 108 is directed horizontally (corridor orientation thus corridor mode) or vertically (normal orientation thus normal mode) based on the orientation information received from the orientation sensors 104, 204. In step 728, the lens and imager system 108 generates a raw image. Then, after the raw image is generated, the image processing unit 604 or 605 de-warps and/or rotates the raw image based on this determined mode (corridor or normal) (step 730). For example, the image processing unit 604 or 605 selects either a corridor image processing algorithm or a normal image processing algorithm which is used in de-warping and/or rotating (e.g., 90 degrees) the raw image. Step 730 generates a corrected image based on the application of either the corridor image processing algorithm or normal image processing algorithm. The image processing unit 604 605 sends the corrected image to be viewed on the monitor 606 and/or recorded by the NVR system 610 at step 714.

Before repeating this process for future images, the camera system determines if the position of the lens and imager system 108 has been adjusted at step 734. In one example, this can be determined by manual input from a user 608 or installer 614. In another example, the camera controller 406 or control system 602 can track if there has been any change in the detected orientation of the lens and imager system 108 by the lens orientation sensor 204. If the lens and imager system 108 has not been adjusted (i.e., no change in orientation), then this process is repeated at step 728 based on the previously determined orientation. If the lens and imager system 108 has been adjusted (i.e., change in orientation), then this process repeats at step 722 for updating orientation of the lens and imager system 108.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security camera, comprising:
    a camera body mounted to a wall or ceiling;
    a body orientation accelerometer for detecting an orientation of the camera body;
    a controller for determining whether camera body is in a ceiling mounted orientation or is in a wall mounted orientation; and
    an orientation feedback system, controlled by the controller, providing an indication to an installer to level the camera body based on whether the camera body is in the ceiling mounted orientation or is in the wall mounted orientation.

2. The security camera according to claim 1, wherein the body orientation accelerometer is mounted to an external surface or an internal surface of the camera body.

3. The security camera according to claim 1, wherein the accelerometer is at least a two-axis accelerometer.

4. The security camera according to claim 1, further comprising a lens and imager system for capturing a raw image, wherein the raw image is de-warped and/or rotated based on the orientation detected by the body orientation accelerometer.

5. The security camera according to claim 4, wherein the lens and imager system is adjustable with respect to the camera body.

6. The security camera according to claim 5, further comprising a lens orientation accelerometer for detecting an orientation of the adjustable lens and imager system.

7. The security camera according to claim 1, wherein the orientation feedback system indicates a degree to which the camera body is off horizontal orientation or vertical orientation based on the orientation detected by the body orientation accelerometer and whether the controller determined that the camera body is in the ceiling mounted orientation or the wall mounted orientation, respectively.

8. The security camera according to claim 7, wherein the orientation feedback system generates light, sound, or web content for indicating degree to which the camera body is off horizontal and/or vertical orientation.

9. An installation method for a security camera, the method comprising:
    a body orientation accelerometer detecting an orientation of a camera body of the security camera after being mounted;
    a camera controller determining whether the camera body is ceiling mounted or wall mounted and a degree to which the camera body is off horizontal or vertical orientation based on the detected orientation from the body orientation accelerometer; and an orientation feedback system indicating degree to which the camera body is off horizontal or vertical orientation.

10. The method according to claim 9, wherein the orientation feedback system is a light emitting diode (LED) that indicates the horizontal/vertical orientation by generating light.

11. The method according to claim 9, wherein the orientation feedback system is a speaker that indicates the horizontal/vertical orientation by generating sound.

12. The method according to claim 9, wherein the orientation feedback system is a web server that indicates the horizontal/vertical orientation by generating web content.

* * * * *